United States Patent [19]
Goodwin

[11] Patent Number: 5,737,109
[45] Date of Patent: Apr. 7, 1998

[54] THERMAL DOWN-MIXING IN DIODE LASER TRANSMITTERS TO SUPPRESS STIMULATED BRILLOUIN SCATTERING

[75] Inventor: John Charles Goodwin, Nepean, Canada

[73] Assignee: Northern Telecom Limited, Montreal, Canada

[21] Appl. No.: 587,046

[22] Filed: Jan. 16, 1996

[51] Int. Cl.$^6$ .................................................. H04B 10/00
[52] U.S. Cl. ........................... 359/161; 359/181; 372/96
[58] Field of Search ..................... 359/111, 132, 359/161, 162, 173, 181, 188; 372/96

[56] References Cited

U.S. PATENT DOCUMENTS

| | | | |
|---|---|---|---|
| 5,329,396 | 7/1994 | Fishman et al. | 359/173 |
| 5,359,450 | 10/1994 | Ramachandran et al. | 359/188 |
| 5,373,385 | 12/1994 | Darcie et al. | 359/132 |
| 5,473,625 | 12/1995 | Hansen et al. | 372/96 |
| 5,477,368 | 12/1995 | Eskildsen et al. | 359/173 |
| 5,550,667 | 8/1996 | Krimmel et al. | 359/180 |

FOREIGN PATENT DOCUMENTS 0 581 525 A1  2/1994  European Pat. Off. ........ H04B 10/04

OTHER PUBLICATIONS

"Optimum Range for DFB Laser Chirp for Fiber–Optic AM Video Transmission", H.A. Blauvelt et al., Journal of Lightwave Technology, vol. 11, #1, Jan.93, pp. 55–59.

"Limitations on Lightwave Communications Imposed by Optical–Fiber Nonlinearities", A.R. Chraplyvy, Journal of Lightwave Technology, vol. 8, #10, Oct.90, pp. 1548–1557.

"Harmonic Distortion Caused by Stimulated Brillouin Scattering Suppression in Externally Modulated Lightwave AM–CATV Systems", F.W. Willems et al., Electronics Letters, vol. 30, #4, Feb. 17, 1994, pp. 343–345.

"Suppression of Brillouin Scattering in Lightwave AM–VSB CATV Transmission Systems", S.P. Mao et al., Conference on Optical Fiber Communications (OFC), Paper W18, 1993.

Primary Examiner—Kinfe-Michael Negash
Attorney, Agent, or Firm—Aprilia U. Diaconescu

[57] ABSTRACT

A method and apparatus for transmitting an analog signal over an optical fiber cable is disclosed. A semiconductor laser provides an optical carrier signal, the laser having the natural linewidth at high power of the same order as the SBS linewidth. The method comprises directly modulating the current of the laser with a dither signal comprising a first component $f_C$ and a second component $f_S$. Due to the nonlinearity of the "I–V" characteristic of the laser, a thermal modulation component $f_T$ appears in the active region. This thermal modulation component reshapes the spectrum of the semiconductor laser to increase the threshold of the SBS. As a result, the energy of the signal transmitted over the optical cable may be increased by approximately 16 dB. The first frequency is at least twice the maximum frequency of the analog signal and the second frequency is selected to obtain $f_C - f_S = f_T$.

20 Claims, 4 Drawing Sheets

THERMAL DOWN-MIXING IN DIODE LASER TRANSMITTERS TO SUPPRESS STIMULATED BRILLOUIN SCATTERING

BACKGROUND OF THE INVENTION

1. Field of the Invention

This invention is directed to an optical transmission system and more particularly to an optical transmission system for carrying a multi-channel signal in analog format over a single mode low loss fiber optic link.

2. Description of the Prior Art

Low loss fiber optic links are often used to send cable television (CATV) signals over long distances, to avoid the alternative of using a cascade of coaxial cable repeaters. To avoid costly signal conversion electronics at the transmit and receive ends, it is advantageous to carry the multi-channel signal in the same analog format as is used in the subscribers' television set, namely, amplitude modulated—vestigial sideband format or AM-VSB. Although the terminal electronics can be relatively inexpensive, this analog signal format has demanding requirements for signal quality. It is necessary that the signal be relatively noise-free, in other words to have a high Carrier-to-Noise Ratio (CNR), and that the distortion be low as well.

To meet these objectives, there are generally two approaches to the transmitter design. A laser diode transmitter can either be directly modulated with the CATV signal, or it can be externally modulated.

Direct modulation of a diode laser transmitter can achieve fairly good CNR and distortion performance when measured right at the transmitter output. However, direct modulation of the laser diode with the CATV signal causes substantial variation of the laser wavelength, called chirping, due to the associated variations in carrier density and temperature. In long lengths of single-mode fiber of, for example, 10 km or more, this unintentional chirping will interact with the chromatic dispersion of the single-mode fiber to generate "second order distortion". A description of this phenomenon is beyond the scope of this disclosure, but further details regarding this type of distortion may be found in literature, for example in the publication by Blauvelt, H. A., Journal of Lightwave Technology, Vol. 11, #1, January 1993, pp. 55–59. For this reason, the direct modulation approach is generally not used for long fiber runs unless extraordinary steps are undertaken, such as sub-octave grouping, dispersion cancellation, etc.

To send multi-channel AM-VSB signals over long lengths of fiber, it is generally preferable to operate the laser diode in a steady state, and subsequently impose the desired CATV signal with a separate external modulator. In this way, since the laser current is not varying, there is no chirping of the laser wavelength and it remains at a well-defined value, with a narrow linewidth. Without chirping, there is no extra distortion generated by the interaction with the fiber dispersion. The fiber link lengths are then limited mainly by loss, and spans of up to 100 km are possible this way.

To get the greatest fiber span possible in a loss-limited regime, the transmitter output power should be as high as possible. If laser diodes are used at the 1550 nm wavelength, power boosting can be done using Erbium Doped Fiber Amplifiers (EDFA). Such amplifiers are capable of boosting the optical power to 50–100 mW. Although such high power levels can support very long fiber spans, problems can be encountered concerning nonlinear interactions with the fiber. Usually the most troublesome nonlinear distortion is Stimulated Brillouin Scattering (SBS), which involves an interaction of the light sent on the fiber with acoustic phonons in the silica material of the fiber. When the optical power in a length of fiber is above the threshold for the onset of SBS, problems appear in the form of enhanced low frequency noise, clipping distortion and saturation of the downstream light. Since the threshold power for SBS can otherwise be as low as 2.4 mW (see for example Chraplyvy, A. R., Journal of Lightwave Technology, Vol. 8, #10, October 1990, pp. 1548–1557), there is a need for a mechanism to reduce or suppress the SBS when using high power out of the EDFA. In the following, the term "SBS suppression" is used to indicate a reduction or suppression of the SBS within the power range of interest.

SBS is generally considered to occur whenever the power contained within the 20 MHz SBS linewidth exceeds a certain threshold. Fortunately, the physics of the SBS interaction itself can be exploited in order to achieve SBS suppression. The acoustic phonons that are involved with the SBS interaction have long lifetimes, resulting in a narrow linewidth for SBS, typically about 20 MHz. This means that if the linewidth of the laser source is wider than this SBS linewidth, it is only a small fraction of the laser line which lies within each 20 MHz portion that can encounter SBS. The power levels which can be used without exciting SBS can then be increased considerably.

Unfortunately, the DFB lasers which are used in many current optical transmission systems tend to have natural linewidths at high power of the same order as the SBS linewidth or narrower. To get around this linewidth limitation of the DFB lasers, it is a known technique to apply a small "dither" modulation current to the laser to broaden the linewidth considerably beyond the inherent value. If a low frequency of approximately 20 kHz is used for this dither, the FM wavelength chirp of the laser can be quite large, more than 1 GHz/mA, due to thermal contributions. This means that only a small dither current can broaden the linewidth sufficiently to get considerable SBS suppression.

On the other hand, the presence of this small dither on the current also causes a small intensity modulation on the emitted light. For many digital applications, the presence of this weak modulation at low frequency is not a problem. However, for analog AM-VSB applications using external modulators, even this weak intensity modulation on the laser light would cause unacceptably large sidebands around each video carrier, and spoil the quality of the video signal.

In order to maintain the quality of the AM-VSB signal, any dither current that is applied to the laser must take place at a frequency which is at least twice that of the highest frequency of the CATV channels being carried. In this way, the intensity modulation which is associated with the dither can be filtered out electrically. Since the usable CATV spectrum can conceivably be considered to extend up to the bandwidth limit of the coaxial cable plant, typically taken as 1 GHz, then the applied laser dither must be at 2 GHz or higher. This is currently most easily done by using a simple sinusoidal modulation of constant amplitude at the desired frequency of 2 GHz or more, as for example the solution disclosed in U.S. Pat. No. 5,359,450 (Ramachandran et al, issued on Oct. 25, 1994 to Synchronous Communications, Inc.). Following the FM response of the laser, the frequency modulation provoked by this dither can be described by a finite number, generally less than 10, of sidebands whose amplitudes are determined by Bessel functions. The spacing between these sidebands is equal to the dither frequency, i.e. 2 GHz or more, which is very wide compared to the 20 MHz SBS linewidth.

With dither frequencies that are large compared to the 20 MHz SBS linewidth, it is appropriate to consider the dithered laser spectrum to follow the classic sideband structure of a frequency modulated (FM) spectrum, where the amplitudes of the sidebands are described by Bessel functions. This is described in a paper by Willems, F. W., published in Electronics Letters, Vol. 30, #4, pp. 343–345. With discrete Bessel function sidebands, typically narrower than 20 MHz, each sideband may hit its own SBS threshold. Each of these sidebands retains the narrow inherent linewidth, so that the strength of any SBS interaction is dominated by the amplitude of the largest sideband. Since the total optical power is distributed over a relatively small number of sidebands, the ultimate SBS suppression may only be 10 dB or so.

In addition, when the dither frequency is 2 GHz or higher, there is no large thermal contribution to the wavelength chirp and only the smaller carrier density chirp, which is typically of the order of 100 MHz/mA, remains. With this small chirp, large laser dither currents at high frequency are required in order to achieve SBS suppression for analog AM-VSB applications.

To get more SBS suppression, it is current practice to increase the dither current to ultimately increase the FM modulation index and distribute the optical power over a larger number of sidebands. By doing this, it is fairly easy to get 6 dB or so of SBS suppression, provided that the laser FM chirp response is large enough. However, there is a diminishing effect with stronger modulation, and 10 dB of suppression would be roughly the upper limit with this method. This 10 dB suppression obtained with prior art methods is insufficient for AM-VSB signals, since the inherent SBS threshold is as low as 2.4 mW (+3.8 dBm), and an EDFA output at 100 mW (+20 dBm) may be required, in which case 16.2 dB of suppression may be needed.

It is evident that there is a limit to the SBS suppression that can be obtained by simple sinusoidal laser dither at high frequencies. To achieve most of this available suppression potential will require a restriction on the minimum FM chirp of the laser. All other things being equal, it would be increasingly difficult to obtain an appropriate SBS suppression at higher laser powers, since carrier-induced FM chirp tends to decrease with increasing optical power.

Whatever determines the limit of the SBS suppression, to get more SBS suppression beyond this point, it is often necessary to use an additional mechanism. Typically, this involves an additional phase modulation that is applied to the external modulator, as proposed by Mao, X. P. et al, Conference on Optical Fiber Communications (OFC) 1993, paper WI8. However, this extra mechanism results generally in a similar sideband spectrum as that of direct laser dither, so that even though it offers some improvement, its effect is also limited.

The main problem with high frequency sinusoidal dither of the laser, and any phase modulation as well, is that the onset of SBS will be determined by the largest of a relatively small number of sidebands over which the optical power is distributed. The number of these sidebands can be increased with diminishing effect only by using extremely large dither.

There is a need to provide a mechanism for increasing the threshold at which SBS occurs, for augmenting the power transmitted over the fiber optic link, to ultimately enhance the quality of CATV transmission.

SUMMARY OF THE INVENTION

It is an object of the present invention to overcome, totally or in part, the drawbacks encountered with the prior art transmitters.

It is another object of this invention to increase the threshold at which SBS occurs for improving the quality of the CATV signal transmission over an optical link.

It is another object of the invention to reduce SBS non-linearity in a CATV system without causing unacceptable sidebands around video carriers.

The invention provides a mechanism to distribute some of the optical power into the intervening gaps between the sidebands of the optical spectrum. In principle, since the gaps are 100 times the width of the SBS linewidth, considerable SBS suppression may be obtained by re-distributing the power in the spectrum.

The down-mixing approach of this invention exploits the dynamic thermal properties of the laser diode, such that a low frequency modulation of the laser temperature is generated by the thermally nonlinear response of the laser to an appropriate dither waveform. "Appropriate" means that the differ current waveform should have substantial sidebands offset from the center frequency by a small frequency difference, while always remaining centered at 2 GHz or above.

The temperature modulation at low frequency causes the laser linewidth to broaden in an effectively continuous fashion. The term "thermal modulation component" defines herein the low frequency component of the laser temperature that is generated when a high frequency dither is applied to the laser current due to the nonlinearity of the "I–V" characteristic of the laser. The low frequency modulation component leads to a thermal modulation in the active region of the laser. The term "low frequency" in this disclosure defines frequencies that are approximately three or more orders of magnitude less than the frequency of the CATV channels being carried over the optical fiber link.

The dithered laser's optical spectrum according to this invention is continuous relative to the 20 MHz SBS linewidth, rather than discrete multi-line, so that the spacing between sidebands is less than the 20 MHz SBS linewidth. Ideally, the low frequency would be down towards 10–20 kHz, so that thermal contributions will start to enhance the FM chirp of the laser. The "thermal down-mixing" approach to dither is a way of obtaining an effectively continuous laser spectrum without applying a low frequency dither current to the laser. Again, this is in contrast to the discrete multi-line spectrum which is necessarily generated with conventional dither. As explained above, this difference in shape of the dithered laser spectrum is far from being just a cosmetic feature.

According to one aspect, the invention provides a method for transmitting an analog signal over an optical fiber cable comprising the steps of: modulating the current of a semiconductor laser with a dither signal comprising a first component of frequency $f_C$ and a second component of frequency $f_S$; obtaining a thermal modulation component in the active region of the semiconductor laser, the thermal modulation component having a frequency $f_T$ determined by the frequencies $f_C$ and $f_S$; thermally modulating the semiconductor laser with the thermal modulation component for reshaping the spectrum of the semiconductor laser to obtain a higher SBS threshold; and generating with the semiconductor laser an optical carrier having a power level according to the higher SBS threshold.

The invention also provides an optical transmission system for transmitting an information bearing analog signal comprising: a semiconductor laser for providing an optical carrier, the laser having a natural linewidth at high power of the same order as the SBS linewidth or less, and a dither generator for generating a dither signal having at least a first spectral component at a first frequency $f_C$ and a second spectral component at a second frequency $f_S$. The first frequency $f_C$ is selected to be at least twice the maximum frequency of the analog signal and the second frequency is selected to be separated from said first frequency by a frequency difference $f_T$. A thermal modulation component of frequency $f_T$ is obtained due to the nonlinearity of the laser "I–V" characteristic, which thermally modulates the laser with the frequency difference.

According to still another aspect, the invention provides a method for reshaping the spectrum of a semiconductor laser for increasing the SBS threshold, comprising the steps of: generating a dither signal comprising a first signal of a first frequency $f_C$ and a second signal of a second frequency $f_S$, and superposing the dither signal over the laser current to obtain a thermal modulation spectral component having a difference frequency $f_T$ equal to the difference between the first and second frequencies.

Advantageously, the invention provides a method that is simple and inexpensive and can be adapted to DFB lasers presently in use.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1a is a plot for a 10 MHz dither; FIG. 1b is a plot for a 100 MHz dither; FIG. 1c is a plot for a 990 MHz dither; and FIG. 1d is a plot for a 2 GHz dither;

DESCRIPTION OF THE PREFERRED EMBODIMENT

Figure 1A:
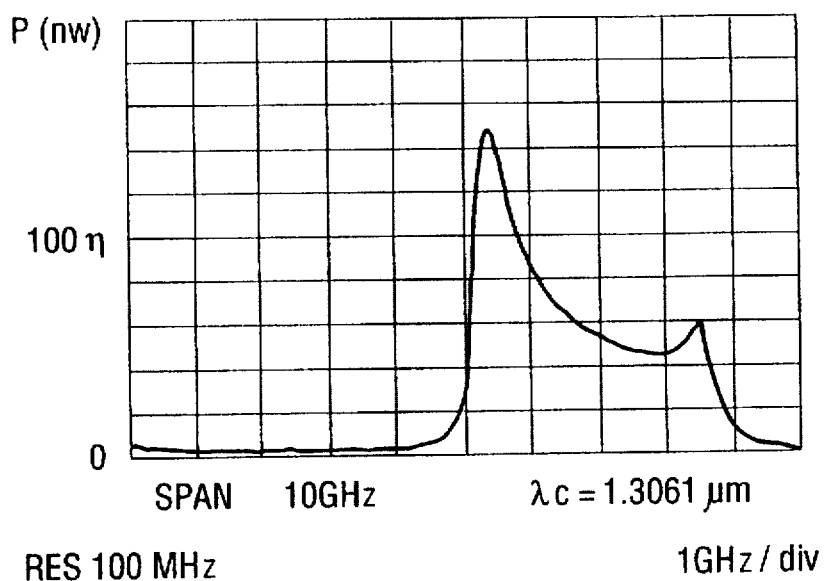
FIGS. 1a to 1d show the spectra of the laser output for various dither frequencies.
Figure 1B:
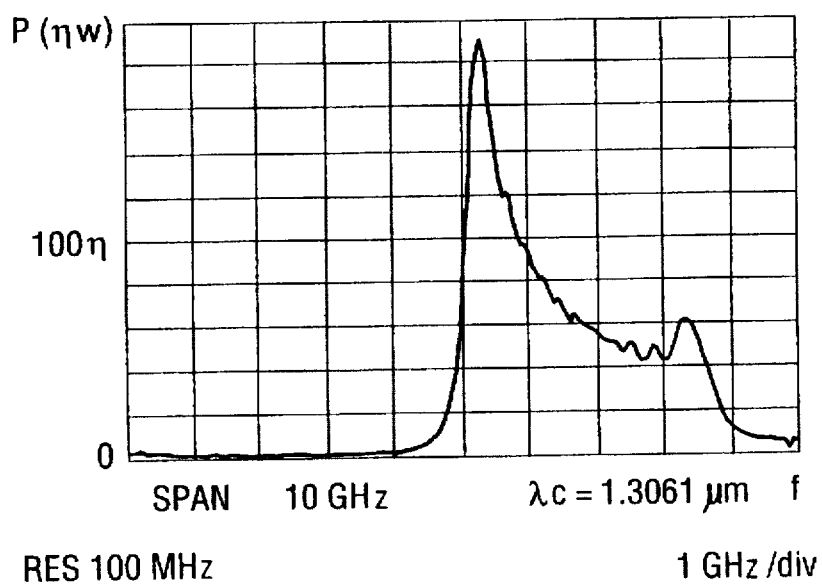
Figure 1C:
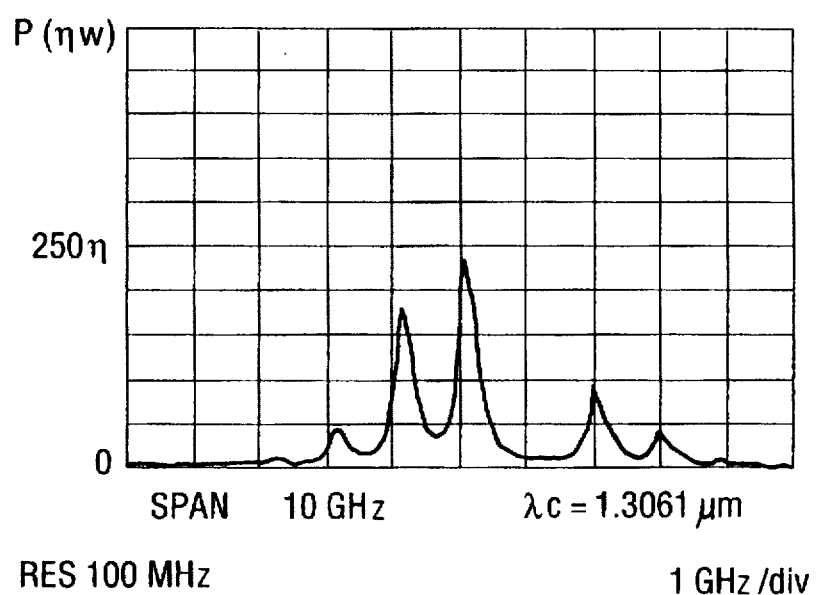
Figure 1D:
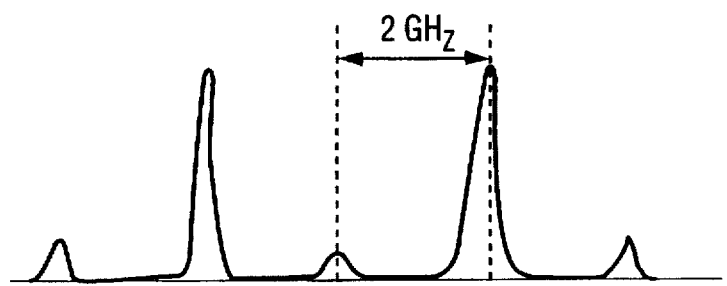

The traces shown in FIGS. 1a to 1c give the frequency dependence for modulated laser spectra obtained experimentally for an optical carrier wavelength $\lambda_C=1.3061$ μm and dither frequencies of 10 MHz, 100 MHz and 990 MHz, respectively. The horizontal scale is 1 GHz/div. in FIGS. 1a to 1c, the vertical scale is 20 nw/div. in FIGS. 1a and 1b and 50 nw/div. in FIG. 1c. FIG. 1d illustrates the spectrum for a 2 GHz dither.

As can be seen from FIGS. 1a and 1b, a relatively low frequency dither of up to 100 MHz leads to a continuous distribution of the optical power—at least continuous relative to the 20 MHz SBS linewidth. Unfortunately, as previously discussed, low frequency dither cannot be used for AM-VSB format because of the residual low frequency intensity modulation that would be left on the light.

As the frequency of the dither increases to be large in comparison to the 20 MHz SBS linewidth sidebands, the spectrum becomes substantially discontinuous. This is shown in FIG. 1c, where a dither of 990 MHz was used.

The amplitude of the sidebands is described by Bessel functions as discussed above, and each sideband retains the narrow inherent linewidth. FIG. 1d illustrates a Power-frequency characteristic for a 2 GHz dither for carrying a CATV signal over the fiber. Here the spectrum is discontinuous, presenting spikes of various amplitudes and gaps of 2 GHz between adjacent sidebands. Since the gaps are 100 times the width of the SBS linewidth, considerable improvement of the SBS suppression may be obtained if the power in the sidebands is redistributed into the gaps between the sidebands.

The present invention provides a method of achieving low frequency modulation of the temperature of the diode laser active region, to generate a wavelength chirp without actually applying a low frequency current. For example, the frequency that may provoke a thermal modulation of the active region of the semiconductor laser may be about 20 kHz.

Typically, laser diode transmitters incorporate a temperature control element which is used to maintain a constant laser temperature despite environmental temperature changes. While this could be used to alter the laser temperature, the package thermal time constants are typically between 0.1–1 seconds, which means that there will not be a usable response at 20 kHz. Therefore, the laser package's temperature control element cannot be readily used to modulate the laser temperature.

According to the present invention, in order to achieve thermal down-mixing, an amplitude modulation is directly applied to the semiconductor laser. One possibility is to have a separate electrical contact and current path close to the active region of the laser diode just to generate a thermal modulation of $f_T$ at the active region, without effectively applying a current of frequency $f_T$ through the active region. This method would require a considerable re-design, and result in a very specialized laser product.

Another method, which is more practical, is to take advantage of the thermal properties of the laser itself, using a technique to generate the required thermal modulation for any generally available laser.

Figure 2:
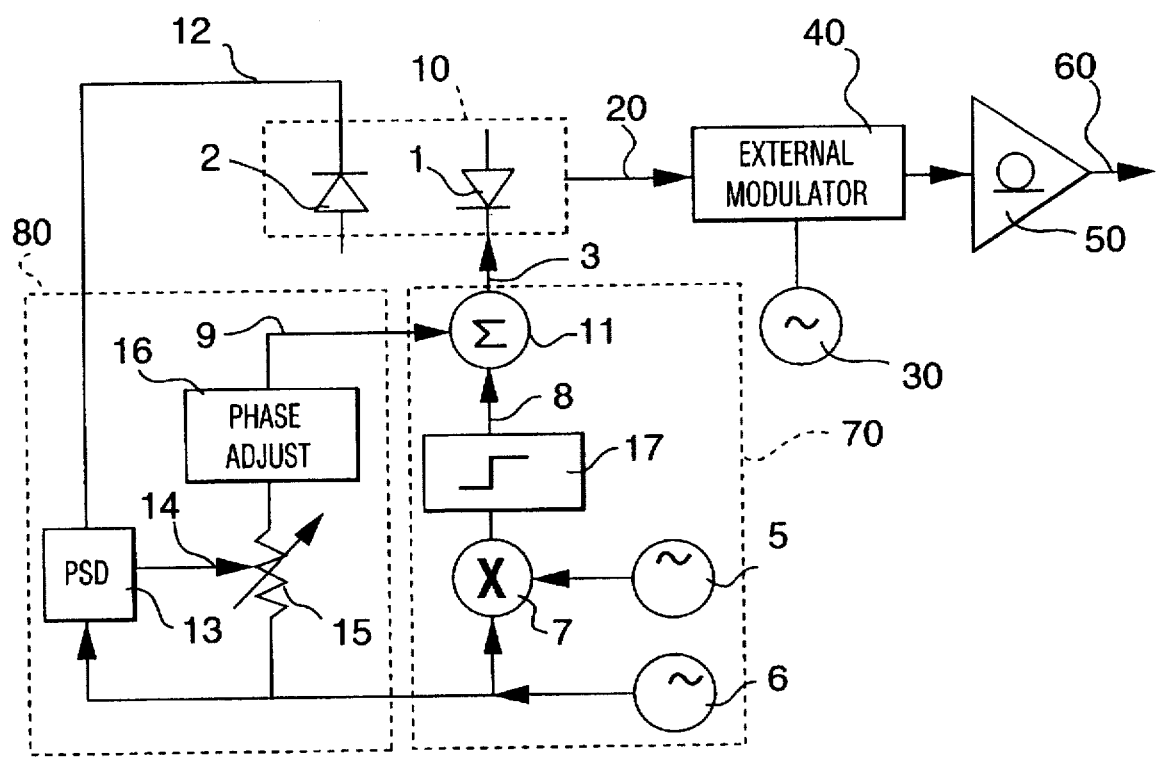
FIG. 2 illustrates a block diagram of the transmitter according to this invention.

FIG. 2 illustrates a block diagram of the optical transmitter according to this invention. A coherent light source 10 generally comprises a laser diode 1, a laser drive unit, and a temperature control unit. The laser drive unit is not illustrated in FIG. 2, as it is a conventional unit and does not directly intervene in the invention. A light transducer 2, commonly called back facet monitor (BFM), is typically installed inside laser sources for monitoring the parameters of the light emitted by laser 1. Light emitted by light source 10 is transmitted over optical fiber 20 and is modulated with the CATV signal in external modulator 40. The CATV signal is provided by generator 30. The post-modulation optical amplifier 50 is used to amplify the signal before it is transmitted over the fiber cable 60 to subscribers. Laser 1 is biased with a DC current which is modulated with a dither signal 3 generated in dither generator 70. In addition, a counterbalancing unit 80 is provided for suppressing any residual low frequency component that may appear in the emitted laser light.

The electrical power that is dissipated in the diode laser 1 can be modeled to first order by the following expression:

$$P_{diss} = I^*V + I^2R - aI \qquad \text{Equation (1)}$$

where:

I is the applied current;

V is the junction voltage of the laser diode considered to be clamped when biased above threshold, at a typical value of 0.8 volts;

R is the series resistance of the laser diode which is typically 5 ohms; and

"a" is a factor related to the slope efficiency of the emitted light.

The first two terms above represent the power that is added to the active region by electrical dissipation (Joule heating). The last term represents the removal of power from the active region by the emitted light.

When laser diode 1 is DC biased well above threshold, a large optical output is obtained on cable 20. Since voltage V in Equation (1) is clamped above threshold, an AC dither modulation at a high frequency $f_C$ of the current (I) will cause only a modulation of the first and third terms of the power dissipation equation with $f_C$. After considering the thermal impedance of the laser package and relevant thermal time constants, the resulting thermal modulation component will be too small to be useful.

However, the second term of the equation is not linearly dependent on the current, but rather depends upon the square of the current. This non-linearity means that if a signal with a pure $f_C$ frequency is applied, there will also be an associated response at the second harmonic and at DC. The nonlinear behavior of the second term becomes more useful if the applied dither waveform is not a pure sine wave of frequency $f_C$, but instead is centered around $f_C$ and has at least two spectral components that are separated by a low frequency, $f_T$. When these two components are applied to the second term of the power dissipation, the non-linearity will generate sum and difference components in the power dissipation. The difference component will then be at $f_T$ in the power dissipation, leading to a component of frequency $f_T$ in the thermal modulation.

In the example shown in FIG. 2, the dither signal 3 output by generator 70 is obtained by mixing a dither carrier ($f_C$) with a low frequency ($f_T$) signal. The high frequency dither carrier generated at 5 and the low frequency signal generated at 6 are mixed in block 7 to obtain sideband components, including sidebands with the difference and sum of the mixed frequencies $f_S=f_C \pm f_T$. The mixer output does not have an $f_T$ component and therefore there is no direct generation of the $F_T$ component on the optical output of the laser. Rather, as indicated above, a difference signal of frequency $f_T$ is generated from these sideband components by the nonlinearity of the laser "I-V" characteristic. The difference signal $f_T$ will thermally modulate the laser to reshape the laser spectrum to a relatively continuous spectrum.

Optionally, a high pass filter 17 may be used which will suppress low frequency components in the amplitude modulated current signal 8. The amplitude modulated signal 8 is then corrected with a variable magnitude error signal 9 for suppressing any components having the frequency $f_T$ that may appear in the emitted laser light. The variable magnitude error signal 9 is applied to a summation block 11, together with amplitude modulated signal 8, to form dither signal 3 which is applied over the control current of the laser 1.

Generally, the dither carrier frequency $f_C$ is selected to be at least twice the frequency band of the information signal. In the case of a CATV signal in AM-VSB format, $f_C \geq 2$ GHz. The frequency of the modulating signal is selected to give a difference signal $f_T$ in a range between 10 to 20 kHz.

It is important to note that this "thermal down-mixing" process has led to a thermal modulation without ever modulating the current with frequency $f_T$ and its unacceptable intensity modulation. By adjusting the amplitude and detailed characteristics of the applied dither carrier waveform, the thermal modulation alters the laser linewidth enough to provide substantial SBS suppression.

There are a number of ways to generate a dither waveform which is centered at $f_C$ but which has components separated by $f_T$. The simplest approach is to have the dither signal consist of just the sum of two sine waves at frequencies $f_C$ and $f_S$, respectively, where $f_S=f_C \pm f_T$. If $f_C$ is 2 GHz, and $f_T$ is 20 kHz, this will result in an amplitude modulated (AM) waveform, having a carrier frequency at 2 GHz, but with a 20 kHz modulation (beating) of the envelope. When such a waveform is dissipated inside the laser diode, the second term in Equation (1) will generate a 20 kHz thermal component, similar to the envelope detection process used in AM radios.

Another method of generating spectral components which are separated by $f_T$ is to strongly AM modulate a carrier $f_C$ with a signal having a frequency $f_T$. The signal may be a sine wave, a triangle or a square wave. If $f_C$ is 2 GHz, and $f_T$ is 20 kHz, this will also result in a 20 kHz envelope on the 2 GHz carrier, which will ultimately lead to a 20 kHz thermal contribution. In case the residual carrier power of ordinary AM modulation has a residual SBS effect, then Double Sideband Suppressed Carrier Modulation (DSBSC) can be used.

As indicated above, the particular hardware used for the dither generator 70 is not limited to the embodiment illustrated and disclosed herein, but it is at the discretion of any person skilled in the art. It is important that a first signal generated with unit 70 for modulating the laser current has a frequency $f_C$ which is higher than twice the band of the information signal. It is also important that a second signal having a frequency which alone, or combined with the frequency of the first signal, gives a low frequency component which effects thermal modulation of the laser at a low frequency determined by the difference between the two signals.

There is still a possibility that the thermal fluctuations of frequency $f_T$ will provoke a weak intensity fluctuation of this frequency in the emitted light. However, the fact that no current modulation at frequency $f_T$ has yet been used can be exploited to cancel any residual intensity modulation.

Counterbalance unit 80 is provided for neutralizing this residual component from the output signal. The light emitted by laser diode 1 is detected with light transducer 2, and a sample signal 12 is diverted from the light source. Sample signal 12 will include any eventual residual optical fluctuations of frequency $f_T$. A variable magnitude cancellation signal 9 at frequency $f_T$ is applied to the summation block 11 with a phase opposite to the phase of the detected 20 kHz component, to cancel out the residual intensity fluctuations in a closed loop manner. This sampling of the emitted light is most conveniently done using the signal from the BFM photodiode 2 which is typically installed inside laser packages, but could also be done by sampling a fraction of the front facet light going to the external modulator.

As described above, the amplitude of the cancellation signal 9 is applied in a closed loop manner, and thereby tracks out any variations due to slight changes in the thermal down-mixing. The analysis of the sampling signal 12 is done with a phase sensitive detector (PSD) 13, which receives the sample signal and the modulating signal. A DC signal 14 proportional to the residual BFM component at $f_T$ is generated at the output of the PSD 13. This signal is used to control the amplitude of the output of generator 6 which is added as variable amplitude cancellation signal 9 to the modulated dither signal 8 in summation block 11. The amplitude of the attenuated output of generator 6 is adjusted with block 15, which may be a potentiometer.

Similarly, the phase of the cancellation signal could also be shifted in a closed loop manner in case this is also necessary to sufficiently reduce the residual low frequency modulation. Phase adjust block 16 provides the correct phase for the cancellation signal 9. In this way, the amplitude and the phase of the error signal 9 may be adjusted to substantially compensate for the residual component in the output signal.

Again, it will be apparent to a person skilled in the art that other embodiments of the counterbalancing unit may be used, without departing from the scope of this invention.

Figure 3A:
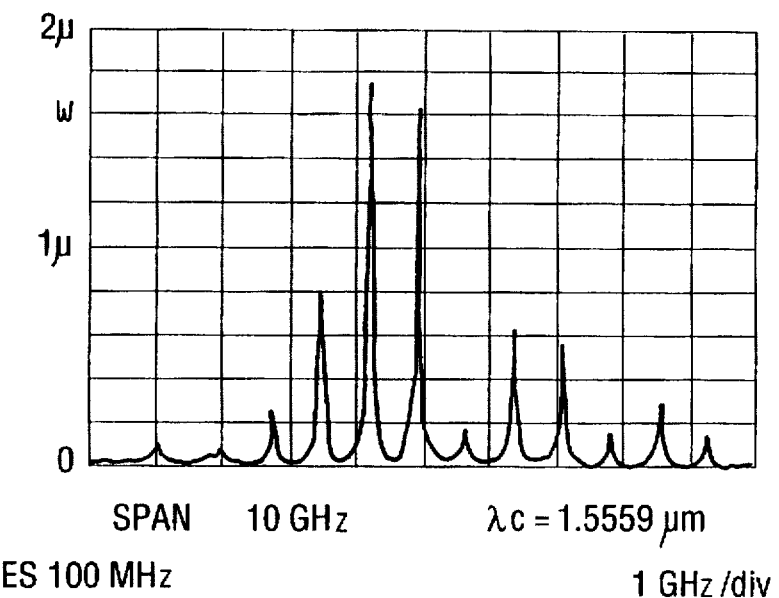
FIG. 3a shows the spectrum of the laser optical output obtained experimentally with a dither according to prior art methods for SBS suppression.
Figure 3B:
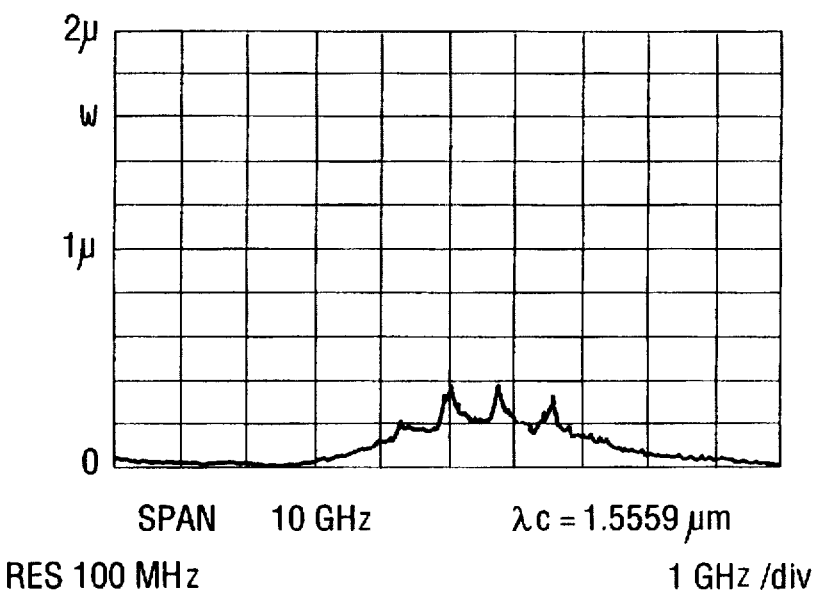
FIG. 3b shows the spectrum of the laser optical output obtained experimentally according to this invention.

FIGS. 3a and 3b show two experimental optical spectrum analyzer outputs of one implementation with a trial 750 MHz dither carrier current applied to the laser. The vertical scale is identical between the two plots. FIG. 3a shows the spectrum of the output signal with the AM off. Several skinny sideband spikes separated by large gaps of 750 MHz are seen in this Figure. FIG. 3b illustrates the spectrum of the output signal when a strong AM modulation is applied to the dither carrier of 750 MHz. The modulating signal for this experiment is a 10 kHz triangle wave at 81% modulation index. It is apparent that an important part of the power that was in the few strong sideband spikes has been redistributed in a continuous background due to the thermal downmixing. Since the SBS threshold depends upon the total power in a 20 MHz "slice" of the spectrum, a factor of 4 (6 dB) improvement is obtained in the SBS threshold with the amplitude modulation, since the largest spike is roughly one-quarter of the height of the largest spike in the case without amplitude modulation. Experimental SBS threshold improvement of this order was in fact obtained.

While the invention has been described with reference to particular example embodiments, further modifications and improvements which will occur to those skilled in the art, may be made within the purview of the appended claims, without departing from the scope of the invention in its broader aspect.

What is claimed is:

1. An optical transmission system for transmitting an analog signal over an optical fiber cable comprising:
    a semiconductor laser for providing an optical carrier, said laser having a natural linewidth at high power of the same order as the SBS linewidth or less;
    a dither generator for generating a dither signal having a first spectral component at a first frequency $f_C$ and a second spectral component at a second frequency $f_S$, said first frequency being at least twice the maximum frequency of said analog signal and said second frequency being separated from said first frequency by a frequency difference $f_T$ which thermally modulates said laser with a thermal modulation component having said frequency difference; and
    counterbalancing unit for detecting in said optical carrier a residual modulation with a frequency equal to said frequency difference and substantially removing said residual modulation from said optical carrier.

2. A system as claimed in claim 1, wherein said frequency difference is approximately 20 kHz.

3. A system as claimed in claim 1, wherein said first frequency $f_C$ is approximately 2 GHz and said frequency difference $f_T$ is approximately 20 kHz.

4. A system as claimed in claim 1; wherein said dither generator comprises:
    a first generator for producing a first signal of said first frequency;
    a second generator for producing a second signal; and
    a mixer for receiving and multiplying said first and second signals and producing said dither signal.

5. A system as claimed in claim 4, wherein said first and said second signals are sinewaves, and the frequency of said second signal is separated from said first frequency by said frequency difference.

6. A system as claimed in claim 5, wherein said first signal is amplitude modulated with said second signal, and the frequency of said second signal is equal to said frequency difference.

7. A system as claimed in claim 6, wherein said second signal is a sinewave and the frequency of said second signal is separated from said first frequency by said frequency difference.

8. A system as claimed in claim 6, wherein said second signal is a triangular wave and the frequency of said second signal is separated from said first frequency by said frequency difference.

9. A system as claimed in claim 6, wherein said second signal is a square wave and the frequency of said second signal is separated from said first frequency by said frequency difference.

10. A system as claimed in claim 4, further comprising a high pass filter for said dither signal, for blocking any component with a frequency equal or less than said frequency difference.

11. A system as claimed in claim 1 wherein said counterbalancing unit comprises:
    means for diverting a sampling signal from said optical carrier;
    means for processing said sampling signal and extracting an error signal having said frequency difference;
    means for adjusting the phase and amplitude of said error signal and producing a compensating signal; and
    means for superposing said compensating signal over said dither signal.

12. A system as claimed in claim 11, wherein said means for processing comprises a phase sensitive detector.

13. A system as claimed in claim 11, wherein said semiconductor laser is a DFB laser.

14. A system as claimed in claim 13, wherein said means for diverting comprises a PIN diode of the back facet monitor of said DFB laser.

15. A system as claimed in claim 1, further comprising an external modulator for modulating said optical carrier with said analog signal to produce a modulated carrier signal.

16. A system as claimed in claim 15, further comprising an optical amplifier for optically amplifying said modulated carrier signal and transmitting said amplified modulated carrier signal over a low loss optical fiber.

17. A system as claimed in claim 1, wherein said analog signal is a CATV signal in AM-VSB format.

18. A method for transmitting an analog signal over an optical fiber cable comprising the steps of:
    modulating the current of a semiconductor laser with a dither signal comprising a first component of frequency $f_C$ and a second component of frequency $f_S$;
    obtaining a thermal modulation component in the active region of said semiconductor laser, said thermal modulation component having a frequency $f_T$ determined by the frequencies $f_C$ and $f_S$;
    thermally modulating said semiconductor laser with said thermal modulation component for reshaping the spectrum of said semiconductor laser to increase the natural SBS threshold to a higher SBS threshold; and
    generating with said semiconductor laser an optical carrier having a power level according to said higher SBS threshold.

19. A method as claimed in claim 18, further comprising the step of modulating said optical carrier with said analog signal to produce a modulated carrier signal.

20. A method as claimed in claim 19, further comprising the step of transmitting said modulated carrier signal over said optical fiber cable.

* * * * *